Aug. 28, 1951  A. C. ZACHLIN  2,565,674
STORAGE BATTERY

Filed July 10, 1947  2 Sheets-Sheet 1

INVENTOR.
ANTHONY C. ZACHLIN
BY
Kwis, Hudson, Boughton & Williams
ATTORNEYS

Aug. 28, 1951     A. C. ZACHLIN     2,565,674
STORAGE BATTERY

Filed July 10, 1947     2 Sheets-Sheet 2

INVENTOR.
ANTHONY C. ZACHLIN
BY
Kwis, Hudson, Boughton & Williams
ATTORNEYS

Patented Aug. 28, 1951

2,565,674

UNITED STATES PATENT OFFICE 2,565,674

STORAGE BATTERY

Anthony C. Zachlin, Cleveland Heights, Ohio, assignor to Willard Storage Battery Company, Cleveland, Ohio, a corporation of West Virginia Application July 10, 1947, Serial No. 760,015

3 Claims. (Cl. 136—177)

The present invention relates to secondary or storage batteries and, more particularly, to the vents thereof.

During charging and/or formation of the plates of secondary or storage batteries of the lead-acid type, oxygen and hydrogen gases are produced at the positive and negative plates, respectively. This is particularly true during the over-charge phase of the process. The gases form a highly explosive mixture in and around the battery and especially in the space underneath the cell cover and above the electrolyte. Usually the batteries are in fairly well ventilated places when they are being charged, etc., and the gases on escaping from the battery are quickly diluted by convection and diffusion below their limits of explosive concentration. Occasionally, however, a flame or spark occurs near enough to the vent of the battery to ignite the gases immediately adjacent thereto, in which event, the flame or explosion outside of the battery flashes back or spreads through the vent to the space below the cell cover, thereby causing an explosion which wrecks or destroys the battery. The dangers to personnel and to surrounding property, as well as to the battery itself, incurred from this hazard are obvious.

Prior to the present invention, numerous attempts have been made to remedy this situation but the means proposed has been either too expensive, cumbersome or otherwise unsatisfactory. With the foregoing in mind, the principal object of the present invention is to provide a novel and improved, simple and inexpensive means for venting a storage battery of the lead-acid type, which venting means will prevent ignition of the gases within the battery by a flame or spark outside of the battery.

Another object of the invention is the provision of a novel and improved venting means for a storage battery of the lead-acid type which is simple and inexpensive in construction and includes a liquid seal for preventing ignition of the gases within the battery by a flame outside of the battery.

Figure 1:
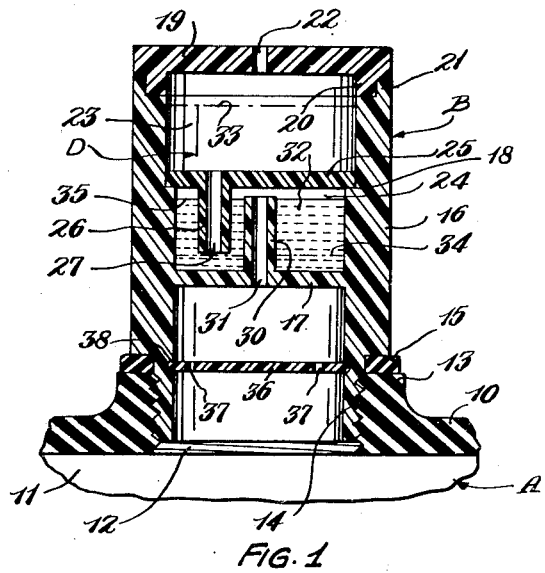
Figure 2:
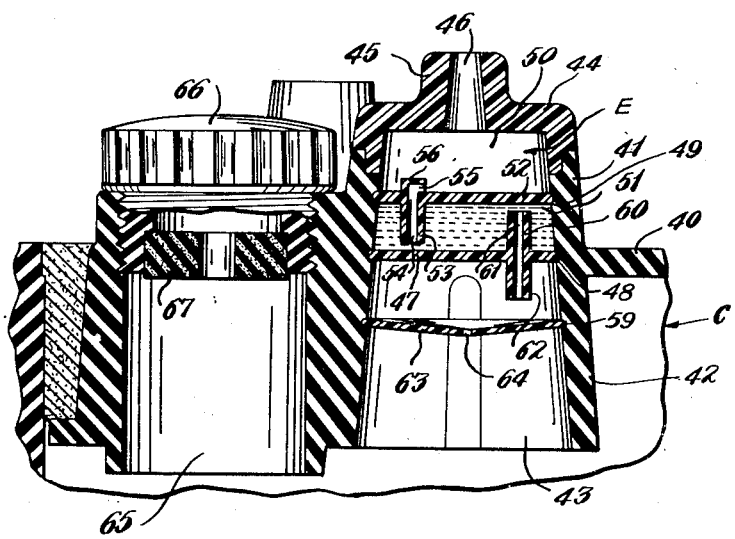
Figure 3:
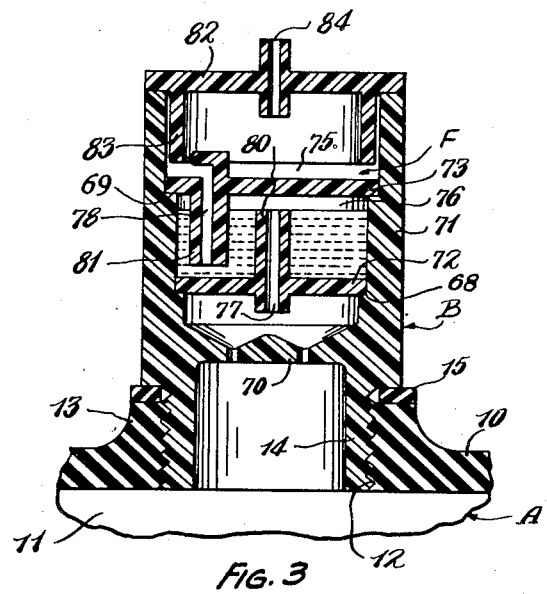
Figure 4:
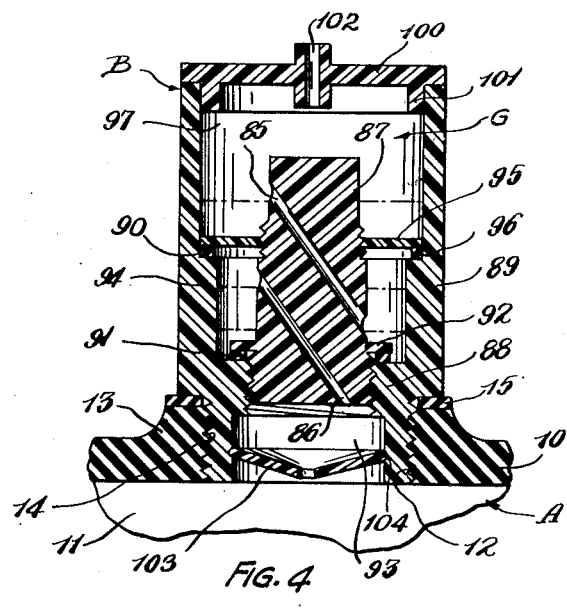

The invention resides in certain constructions and combinations and arrangements of parts and further objects and advantages will be apparent to those skilled in the art to which it relates from the following description of two preferred embodiments of the invention described with reference to the accompanying drawings forming a part of this specification, and in which Fig. 1 is a fragmentary sectional view of a storage battery of the lead-acid type embodying the present invention and having its venting means in the cap or plug for the filling opening;

Fig. 2 is a fragmentary sectional view of a similar storage battery also embodying the present invention but having its venting means separate from the filling opening and plug or cap therefor; and Figs. 3 and 4 are views similar to Fig 1 but showing further modified constructions.

Referring to Figs. 1, 3 and 4 of the drawings, the reference character 10 designates the cell cover of a conventional, multi-cell storage or secondary battery of the lead-acid type, designated generally by the reference character A. Only portions of the cover 10 and case 11 of the battery are shown. The cell cover 10 is provided with the usual filling opening 12 surrounded by a raised boss 13 which prevents electrolyte or other liquid spilled or otherwise present on the top of the battery from running into the interior of the battery when the filling opening is open. The filling opening 12 is internally threaded and is normally closed by a cap or plug B which also includes venting means for the cell incorporating the present invention.

The filling opening cap or plug B is of special construction and the venting means incorporated therein includes a water or other liquid seal, preferably non-freezing electrolyte, for preventing gases within the cell to which it is applied from becoming ignited by a spark or flame outside of the battery, which spark or flame, except for the liquid seal shown, might flash or spread through the venting means to the interior of the battery. The cap B is preferably made of some suitable transparent material inert to the electrolyte of the battery; for example, polystyrene or methyl methacrylate, and is provided with a reduced, lower threaded end 14 adapted to be screwed into the upper end of the filling opening 12. A rubber washer 15 interposed between the upper end of the boss 13 and a shoulder formed on the cap by the reduced lower end 14 provides an effective, gas-tight seal therebetween and the cell cover 10 when the filler opening cap is screwed into position in the filling opening 12 of the cell cover so as to direct the evolved gases through the cap B and to prevent them from circumventing it.

As shown in Fig. 1, the filler opening cap comprises a tubular member 16 provided with a transversely extending web or partition 17 molded integral with the member proper and located about two-thirds of the length of the member from the top. Alternatively, the partition 17 may be made of a separate member and/or located at the lower end of the member 16 or at any other suitable place spaced from the top of the member to provide a chamber or aperture D in the member above the partition. The chamber D in the member 16 above the partition 17 is closed at the top of the member 16 by a disk-like cap 19 having a downwardly extending, peripheral flange 20 spaced slightly inwardly of the edge of the disk, which flange fits within an upstanding, peripheral flange 21 on the upper end of the number 16. The connection between the parts 16, 19, or, more specifically, between the flanges 20, 21 is a relatively close fit so that the cap 19, although being held against accidental removal from the top of the member 16, may be blown free of the member 16 in the event gas confined within the chamber underneath the same is ignited for any reason and explodes. The cap 19, like the member 16, is preferably made of transparent material inert to the electrolyte of the battery and is provided with a central aperture 22 to allow gas accumulating therebeneath to escape to atmosphere. The cap 19 prevents spilling of the sealing liquid in the event the battery is rocked or jarred, as may occur when used on a moving vehicle. The cap also prevents the entrance of dirt into the chamber below. If desired, the cap can be omitted, especially in the case of stationary batteries, where its principal function is to prevent the entrance of dirt into the chamber therebelow.

The chamber D in the upper part of the member 16 formed by the partition 17 is divided into two vertically spaced compartments 23, 24 by a disk-like member 25 located about midway between the partition 17 and the cap 19 and fixedly secured within the member 16 in any suitable manner. The member 25 forms a partition in the chamber D and rests upon an annular ledge 18 formed by a counterbore in the upper end of the tubular member 16 to which it is cemented by a suitable solvent or cement. Alternatively the partition 25 may be formed integral with the member 16 or secured therein in any suitable manner.

The partition or member 25 includes an elongated boss 26 located to one side of the center of the member 16 and projecting downwardly therefrom to a point adjacent to but slightly spaced from the upper side of the partition 17. The boss 26 is provided with a longitudinal aperture 27 extending therethrough which provides a conduit communicating with the compartment 23 above the member 25 and the lower part of the compartment 24 between the partitions 17, 25. The partition 17 comprises a somewhat similar boss 30 located adjacent the center of the member 16 and extending upwardly to a point adjacent to but slightly spaced below the underside of the member 25. The boss 30 is provided with an aperture 31 extending longitudinally therethrough which forms a conduit communicating with the chamber or aperture in the member 16 below the partition 17 and the upper part of the compartment 24 of the chamber D in the chamber D in the member 16 above the partition 17.

The compartment 24 intermediate the partitions 17, 25 is filled to the top of the boss 30 with a non-freezing, non-burning liquid 32, preferably electrolyte. When the gases produced within the battery escape from the top of the electrolyte, they carry with them a film of electrolyte. Some of this electrolyte will be carried along with the gases up through the venting opening or conduit 31 in the partition 17 and the boss 30 into the compartment 24 where it will collect and fill the compartment or maintain the same full. If sufficient electrolyte is not carried into the compartment 24 by the gases escaping from the cell, the compartment can be maintained full to the level of the top of the boss 30 by adding electrolyte to the upper compartment 23 either through the aperture 22 or by removing the cover 19. The electrolyte added to the upper compartment 23 will flow through the aperture or conduit 27 in the partition 25 and boss 26 into the lower compartment 24. Any electrolyte collecting in the compartment 24 in addition to that required to fill or maintain the same full to the level referred to will flow into the cell through the conduit 31. The fact that the cap or plug B is made of transparent material makes it easy to see whether or not there is sufficient liquid in the compartment 24 to maintain a proper seal.

The accumulation or presence of electrolyte in the compartment 24 because of the fact that the openings or ports of the conduits 27, 31 into the compartment are spaced vertically with respect to each other, the opening for the conduit 27 being a considerable distance below the opening for the conduit 31, will cause gas pressure to build up in the cell proper and in the compartment 24 above the liquid therein and below the partition 25. As the gas pressure builds up in the compartment 24 of the chamber D, the electrolyte in the lower part of the compartment will be forced up through the conduit 27 into the upper compartment 23 until the level of the electrolyte in the lower compartment 24 descends to the lower end of the boss 26. After the level of the electrolyte in the compartment 24 has descended to the lower end of the boss 26, additional gas accumulating in the compartment 24 will escape through the conduit 27 in the partition 25 to the compartment 23 where it will bubble up through the electrolyte therein and escape to atmosphere through the aperture 22 in the cap 19. The approximate level of electrolyte in the upper and lower compartments 23, 24 when the cell is gassing is indicated by the dot-dash lines 33, 34 and when not gassing, the electrolyte will stand in the lower compartment 24 to a height by the line 35.

In addition to the parts referred to, the cap is provided with a baffle 36 extending across the opening in the lower end thereof, which baffle is provided with a plurality of apertures 37, preferably disaligned with the lower end of the aperture 31 through the partition 17. The baffle 36 prevents the electrolyte from splashing up into the lower end of the conduit 31 and helps to reduce the amount of the electrolyte carried to atmosphere by the gases escaping through the vent. The fact that the gases escaping from the cell bubble through the electrolyte 32 in the cap also helps to strip the gas bubbles of their acid film. In the embodiment referred to, the baffle 36 is in the form of a relatively thin, disk-like member snapped into position in a groove 38 in the lower end of the member 16. Alternatively the baffle may be of nay suitable shape and connected to the member 16 in any desired manner or may be omitted altogether.

While a particular construction has been shown in Fig. 1, it will be apparent that numerous changes may be made therein so long as the proper liquid seal is maintained, through which seal the gases must bubble as they escape from the cell to the outside atmosphere. One way of incorporating the invention in a battery which has its venting means separate and apart from the filling opening, such as the battery shown in U. S. Patent No. 2,169,771, issued August 15, 1939, and assigned to the assignee of the present invention is shown in Fig. 2. As shown in this figure, the cover 40 of the battery C corresponding with the cover 10 of the battery A shown in Fig. 1, is provided with two aligned bosses 41, 42, one extending above and the other below the cover proper. The bosses are slightly tapered but they are approximately of the same diameter as the outside diameter of the member 16 of Fig. 1 and have a continuously tapered aperture 43 extending therethrough whereby a generally tubular member similar to the tubular member 16 is provided except that it is integrally connected intermediate its ends to the cell cover proper.

The upper end of the external boss 41 is closed by a cap 44 having a raised central boss 45 provided with an aperture 46 extending therethrough and is connected to the upper end of the boss in a manner similar to that in which the cap 19 is connected to the upper end of the tubular member 16. A partition 47 in the form of a relatively thin disk snapped into an annular groove 48 formed in the inside wall of the tubular part formed by the bosses 41, 42 provides a chamber E corresponding with the chamber D of the embodiment shown in Fig. 1. The chamber E is divided into upper and lower compartments 50, 51 corresponding to the compartments 23, 24 by a partition 52 in the form of a separately formed, relatively thin disk secured in position in the boss 41 by being snapped in an annular groove 49 in a manner similar to that in which the disk 47 is secured therein. In addition to being snapped into the annular grooves 48, 49 referred to, the partitions 47, 52 may be cemented therein as it is imperative that the connections therebetween and the cover be air and liquid tight.

The upper partition 52 is provided with a downwardly extending boss 53 similar to the boss 26 having an aperture 54 extending therethrough and through the partition 52, the upper end of which aperture communicates with a transversely extending aperture 55 formed in a projection 56 on the upper side of the partition 52. The transversely extending upper part of the conduit through the partition 52 helps to break up the gas bubbles as they pass into the upper compartment 50 from the lower compartment 51. The lower partition 47 is provided with a boss 60 similar to the boss 30 of the partition 17 except for the fact that it is located to one side of the center of the aperture 43 extending through the cover. The lower end of the opening 61 through the boss 60 and the partition 47, which opening corresponds with the opening 31 of the embodiment shown in Fig. 1, communicates with or is extending through a boss 62 similar to the boss 60 but located on the lower side of the partition 47.

As shown in Fig. 2, the baffle 63 which is formed by a relatively thin, disk-like member snapped into an annular groove 59 in the interior of the boss 42 is provided with a central opening 64 offset with respect to the lower end of the aperture 61 so as to form an indirect path for the gases escaping from the cell, thus causing more of the electrolyte to collect in the chamber intermediate the partition 47 and the baffle 63 and return to the cell proper instead of being carried by the gases through the vent to the outside atmosphere. In order to permit inspection of the electrolyte in the lower compartment 51 of the chamber E formed by the partition 47, the entire device, including the cover proper, may be made of transparent material inert to the electrolyte or only the cap 44 and the partition 52 formed of transparent material. In this event, the level of the electrolyte can be inspected either through the cap 44 and the partition 52 or the cap 44 can be removed.

In addition to the venting means just referred to, the cover 40 comprises a filling opening 65 formed separate and apart from the venting means and normally closed by a plug or cap 66 having a soft rubber washer 67 in the lower end thereof adapted to fit over the upstanding flange 45 of the member 44. When the battery is to be filled, the cap 66 including the washer 67, is removed from the filling opening and placed over the flange 45 so as to close the vent opening, thus preventing overfilling of the cell.

A further modification of the vent plug or cap shown in Fig. 1 is shown in Fig. 3. As shown in this figure, the baffle 70 is formed or molded integral with the tubular member 71 corresponding with the member 16 of Fig. 1 and the partitions 72, 73 corresponding with the partitions 17 and 25 are constructed somewhat similar to the partitions 47 and 52, respectively, of the embodiment shown in Fig. 3 but are secured in the member 71 by being positioned upon annular ledges 68, 69 in the member 71 formed by counterbores in the upper end thereof similar to the manner in which the partition 25 is secured within the member 16. The partition 72 forms a chamber or aperture F in the upper end of the member 71, which chamber is divided into upper and lower compartments 75, 76 by the partition 73. The partitions 72, 73 have conduit means therethrough in the form of apertures 77, 78, respectively, which conduit means communicate with the lower compartment 76 at vertically spaced points, thereby causing electrolyte to be trapped in the lower compartment 76 to the height of the upper end of the boss 80 through which the conduit 77 extends, which is an appreciable distance above the lower end of the boss 81 which contains the aperture 78. The upper end of the member 71 is closed by a disk-like cap 82 having a downwardly extending, annular flange 83 spaced slightly from the periphery thereof, which flange extends to a point adjacent to but slightly above the upper side of the partition 73. In view of the fact that the flange is of considerable length, it can loosely fit within the upper end of the chamber F without being accidentally displaced and, as shown, has a loose fit therein. A vent 84 through the cap 82 consists of a continuous aperture extending through two aligned bosses projecting from opposite sides of the member 82 at the center thereof. This construction provides a non-rectilinear path for the gases as they pass through the upper compartment 75 of the chamber F formed by the partition 72 which assists in removing some of the liquid film carried by the gas bubbles.

A still further modification of the invention is shown in Fig. 4. As shown in this figure, the conduits 85, 86 corresponding with the conduits 27, 31 of the embodiment shown in Fig. 1 are formed by inclined, spaced apertures in a cylindrical member 87, the lower end of which is threaded into a suitably tapped hole extending through a partition 88 formed integral with the tubular member 89 corresponding with the tubular member 16 of the first-mentioned embodiment. The partition 88 forms a chamber or aperture G in the upper part of the member 89 similar to the chambers D, E and F of the previous embodiments. The threaded connection between the member 87 and the partition 88 may be sealed in any suitable manner. As shown, this is accomplished by a rubber or like washer 91 interposed between the upper side of the partition 88 and an annular flange 92 formed integral with the member 87 above the lower threaded end thereof. The upper end of the member 87 may be provided with a suitable driving connection such as, a screw driver slot or a hex shape in order to facilitate screwing it into the aperture in the partition 88. The lower aperture or conduit 86 in the member 87 communicates with an opening 93 in the lower end of the tubular member 89 below the partition 88 and with the upper part of the lower compartment 94 of the chamber G, which compartment is formed by the disk-like member or partition 95, screwed onto a threaded part of the member 87 about midway between the ends thereof. The periphery of the member 95 engages a rubber or like washer 96 which is interposed between the lower side of the member 95 and a ledge 90 formed in the member 89 by a counterbore in the upper end thereof. As previously suggested, the partition 95 may be otherwise constructed or may be sealed to the parts 87, 89 in any convenient manner. The lower end of the upper aperture or conduit 85 communicates with the compartment 94 near the lower end thereof, that is, at a place below the opening of the upper end of the conduit 86 into the same compartment. The upper end of the conduit 85 opens into the upper compartment 97 above the partition 95. The upper end of the chamber G is closed by a cap 100 similar to the cap 82 previously referred to but having a downwardly extending flange 101 of less length than the flange 83 and fitting more tightly within the counterbore in the upper end of the member 89. The cap 100 is provided with a vent 102 consisting of a continuous aperture extending through two aligned bosses projecting from opposite sides of the member 82 at the center thereof. In addition to the parts previously referred to, the embodiment shown in Fig. 4 includes a baffle 103 similar to the baffle 63 and held in the aperture 93 by being snapped into an internal groove 104 in the lower end of the member 89.

From the foregoing, it will be apparent that the objects of the invention heretofore enumerated and others have been accomplished and that there has been provided a battery having novel and improved venting means, simple in construction and inexpensive to manufacture, and which will permit normal venting of the battery while preventing igniting of gases within the battery from a flame outside of the battery. Including the baffles and the movable top members, the embodiments shown merely comprise four and five easily assemblable parts. Both of the partitions shown in Fig. 2 are readily replaceable in the event of damage which facilitates and reduces the cost of maintenance. This is of especial importance where the venting means is incorporated in the cover proper, as distinguished from a readily replaceable closure member for the filling opening.

While four preferred embodiments of the invention have been described in considerable detail, the invention is not limited to the particular construction shown and it is my intention to cover hereby all adaptations, modifications and uses thereof which come within the practice of those skilled in the art to which the invention relates and the scope of the appended claims.

Having thus described my invention, I claim:

1. Venting means for a storage battery of the lead-acid type comprising a member provided with an aperture opening into the top thereof, a movable member frictionally secured to said member for closing the upper end of said aperture, one of said members having a small passage therethrough communicating with the upper end of said aperture and atmosphere, a pair of vertically spaced horizontal partitions in the first mentioned member intermediate the ends of said aperture and dividing said aperture into upper and lower compartments, said partitions having portions overlapping each other vertically and provided with apertures extending therethrough, said upper compartment having a volume greater than the volume of that portion of said lower compartment between the vertically spaced openings of said apertures through said partitions, whereby liquid normally will be retained in said lower compartment between said partitions to a height sufficient to seal the lower end of said aperture through said upper partition and the portion of liquid between said vertically spaced openings in said lower compartment will be forced into said upper compartment during venting.

2. Venting means for a storage battery of the lead-acid type comprising a molded member provided with an aperture opening into the top thereof, a movable member frictionally secured to said member for closing the upper end of said aperture, one of said members having a small passage therethrough communicating with the upper end of said aperture and atmosphere, a pair of vertically spaced horizontal partitions in said molded member intermediate the ends of said aperture and dividing said aperture into upper and lower compartments, one of said partitions being molded integral with said molded member, conduit means opening in said upper and lower compartments, the upper of said partitions having a projecting boss extending toward the bottom of said lower compartment and an aperture or conduit means through said partition and boss opening at its lower end adjacent to the bottom of said lower compartment, said molded member having conduit means adapted to communicate with the interior of a battery and opening into said lower compartment adjacent to the underside of said partition, said upper compartment having a volume greater than the volume of that portion of said lower compartment between said vertically spaced openings of said conduit means thereinto, whereby liquid normally will be retained in said lower compartment to a height sufficient to seal the lower opening of said first-mentioned conduit means and the portion of liquid between said vertically spaced openings of said conduit means in said lower compartment will be forced into said upper compartment during venting.

3. Venting means for a storage battery of the lead-acid type comprising a member provided with an aperture opening into the top thereof, a movable member frictionally secured to said member for closing the upper end of said aperture, said movable member having a small opening or conduit therethrough, a pair of vertically spaced horizontal thin disk-like partitions removably secured in said member intermediate the ends of said aperture and dividing said aperture into upper and lower compartments, said partitions having small diameter projecting bosses overlapping each other vertically and having apertures or conduit means therethrough opening into said lower compartment adjacent to opposite ends of said lower compartment, said upper compartment having a volume greater than the volume of that portion of said lower compartment between the vertically spaced openings of said conduit means thereinto, whereby liquid normally will be retained in said lower compartment to a height sufficient to seal the lower opening of said conduit means through said upper partition and boss and the portion of liquid between said vertically spaced openings of said conduit means in said lower compartment will be forced into said upper compartment during venting.

ANTHONY C. ZACHLIN.

REFERENCES CITED

The following references are of record in the file of this patent:

UNITED STATES PATENTS

| Number | Name | Date |
|---|---|---|
| 930,065 | Ford | Aug. 3, 1909 |
| 1,331,795 | Bachman et al. | Feb. 24, 1920 |
| 1,389,174 | Wheat | Aug. 30, 1921 |
| 1,992,875 | Mobley | Feb. 26, 1935 |
| 2,139,477 | Townsend | Dec. 6, 1938 |
| 2,436,465 | Wilson | Feb. 24, 1948 |

FOREIGN PATENTS

| Number | Country | Date |
|---|---|---|
| 20,891 | Great Britain | Sept. 8, 1910 |
| 104,320 | Great Britain | Mar. 1, 1917 |